Feb. 18, 1930.                F. L. SCOTT                1,747,394
                BEARING FOR ROLLER EARTH BORING DRILLS
                        Filed Nov. 3, 1925
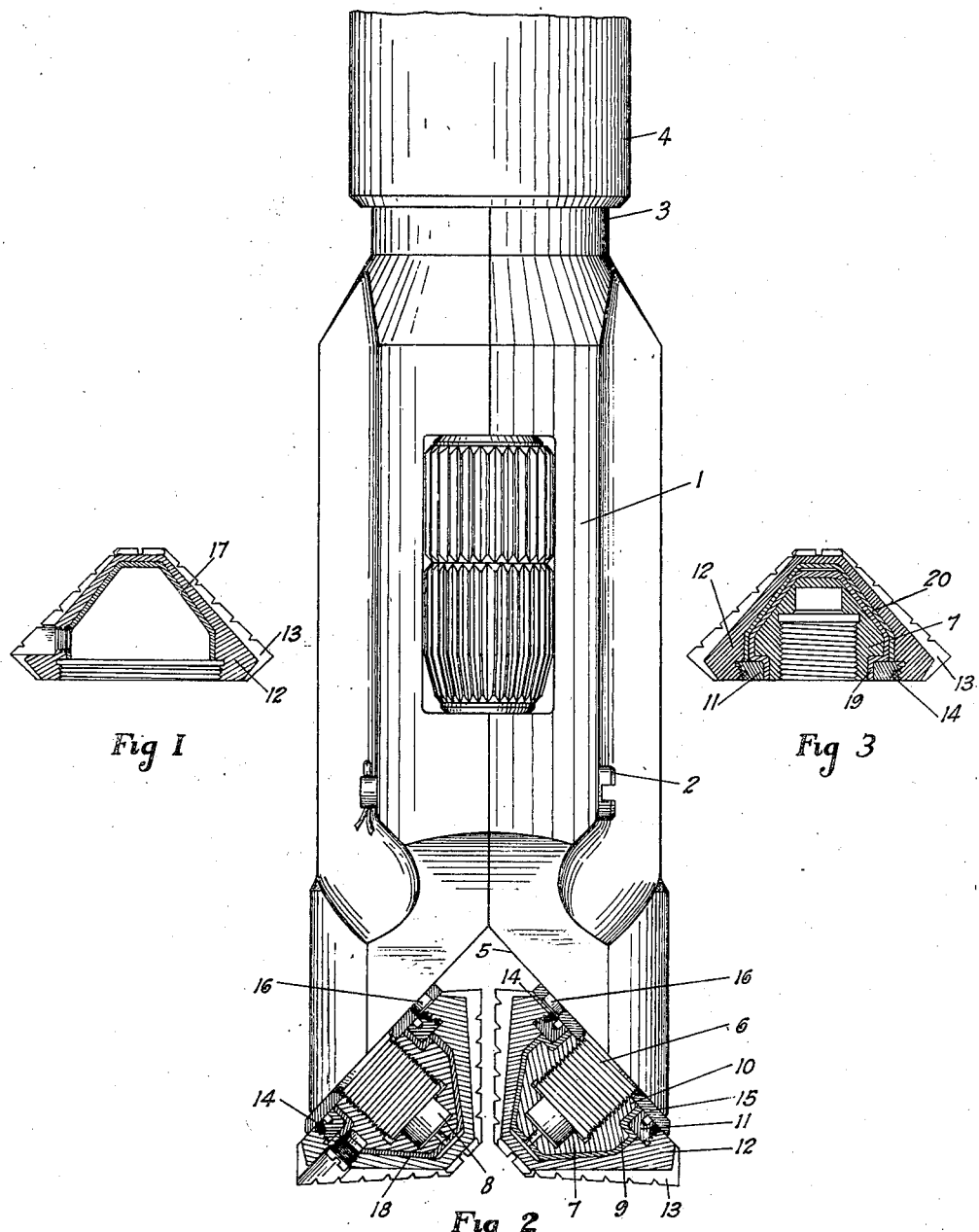

Patented Feb. 18, 1930

1,747,394

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

BEARING FOR ROLLER EARTH-BORING DRILLS

Application filed November 3, 1925. Serial No. 66,457.

My invention relates to bearings for the roller cutters of earth boring drills of the type employed in drilling deep wells for oil, gas, water, and the like.

In drilling wells by the rotary system of drilling the drill bits commonly employed, particularly for hard formations, include a drill head having rolling cutters thereon projecting in advance of the head. Said cutters are caused to roll upon the bottom of the hole by the rotation of the drill head, and in so doing, they cut into and disintegrate the material with which they contact. The material thus detached from the stratum and comminuted by the drill cutters is washed upwardly to the surface by the flow of flushing fluid pumped downwardly through the drill stem and the drill.

The bearings of roller cutters on earth boring drills are subject to conditions not obtaining with other types of bearings. They must sustain excessive loads, at temperatures that are frequently high, and the size of the bearing is restricted for operation in spaces of limited size. The drills now ordinarily employed vary in diameter from about three inches to twenty inches, the average size being about ten inches. The drill is secured at the lower end of the drill stem, which is heavy pipe, and in deep wells, the total weight of the drill stem cannot be entirely supported upon the drill itself, but a large part of the weight is supported by cables from the upper end of the derrick.

The cutter bearings of a rock drill ordinarily operate with a bearing pressure thereon of about 1,500 pounds per square inch. When operating, the rubbing velocity upon the bearing is about 100 feet per minute. It is also a circumstance peculiar to hard formation drills that the stratum may vary as to hardness or may be uneven on the bottom of the hole, so that bearing stresses are unequal on different points of the bearing surface. High temperatures arise due to friction, and experiment shows that the temperatures at the bearings sometimes exceed 750° Fahrenheit. Ordinary metal is softened under such temperature, and the temper of the steel may be drawn. When it is understood that the size of the bearings may not be increased to meet the heavy duty which they have to undergo, due to the restricted space in which they operate, it will be seen that extraordinary precaution must be taken in constructing the bearings. Being operated beneath the surface of the ground, sometimes as much as a mile below the operator, lubrication is difficult, and the bearings must be so constructed that they will operate without inspection under extremely difficult conditions.

It is an object of the invention to provide a bearing for earth boring roller drills that will maintain its form and its degree of hardness or resistance to wear, under high pressures and temperatures. It is desired that the cutter shaft and bearing be capable of withstanding heavy loads, and therefore tough and ductile, but that the bearing or rubbing surface between the cutter and its bushing be particularly resistant to wear under heat and pressure.

Referring to the drawing herewith, Fig. 1 is a central section through a drill cutter. Fig. 2 is a side elevation of a common type of hard formation well drill showing the cutters thereon in central section. Fig. 3 is a central vertical section through a cutter and bearing illustrating a slight modification of the inventive idea. Like numerals of reference are employed to designate like parts in all the views.

In the drawings the invention is shown as applied to a specific type of well drill adapted for use in rock or other hard formation; but it must be understood that it may be employed on various other types of rolling cutter drills, employed in well drilling. There is a head 1 divided longitudinally into two parts held together adjacent the lower end by bolts 2. The upper threaded shank 3 is secured to the drill stem by means of a drill collar 4.

The lower end of the drill has an inverted V-shaped recess 5 therein. Opposite cutter shafts 6 are formed on the inner flat faces of said recess adjacent the lower end, said shafts thus converging inwardly as shown. While it is contemplated that the bearing bushing may be integral with the supporting shaft, I have shown the shafts as threaded to receive a separate bushing 7. The end of the shaft is reduced in diameter at 8, and the surface of the reduced point is left smooth. The bushing 7 surrounds the shaft, and fits over the end thereof. It is approximately frusto-conical in shape at its forward end, the central area of largest diameter 9, being cylindrical. The inner end of the bushing has a neck 10 to receive a locking ring 11 upon the cutter 12.

The cutter is also frusto-conical on its forward cutting end, and is provided with cutting teeth 13 to engage the bottom of the hole. It is shaped on its inner face to fit about and surround the bushing 7. The locking ring 11 is threaded into the outer end of the cutter, and is locked in position by welding metal into the recess 14 in the ring adjacent the cutter. A washer 15 separates the cutter and its bushing from the head 1. Said washer is held from rotating by a dowel pin on the head, fitting within a hole in said washer.

The cutter rotates on its bearing provided by the bushing 9, and as the rubbing surface between the cutter and bearing must resist high pressures and temperatures, I contemplate forming the bushing of a tough and hard steel properly tempered. The surface is then covered by a thin layer of extremely hard metal, preferably of a non-ferrous nature, although some steel alloys commonly called "high-speed" steel may be employed. Such metal must also be resistant to abrasion, and capable of maintaining its form and hardness at high temperatures. The metal I prefer to employ for the outer coating, shown at 8 in Fig. 2, is a non-ferrous alloy called stellite. It is a composition of cobalt, chromium, and some other metal or metals of the chromium group, including tungsten and molybdenum, and may be purchased in the market. While this metal is extremely hard and heat resistant, it is not tough or ductile, and must be deposited upon the surface of the bushing by welding with a torch. The surface must then be smoothed by grinding, and the bushing is complete.

Although, I prefer the wear resisting surface of stellite upon the bushing, I contemplate that it may be employed upon the inner surface of the cutter instead, as shown at 17 in Fig. 1, or, on both bearing and cutter surfaces. Also there may be a surfacing of high speed steel upon one wearing surface 19, and another of stellite upon the other surface 20, as shown in Fig. 3. By thus forming the cutter and body of the bushing of tough steel to resist fracture and strains, the wearing surfaces will still be extremely hard, and will withstand the usual friction and heat for long periods without appreciable wear. The bearing will then continue in good condition as long as the outer cutting surface of the cutter will wear before the cutter is discarded.

The advantages of thus forming the bearing surfaces will be apparent. High concentration of bearing pressures with resultant local failure of lubrication, while producing local high temperature will not soften the bearing surfaces and cause undue abrasion or galling, or noticeable flow of the surface.

The hardness of the bearing surface being maintained even at high temperature will better resist the abrasion of sand grains which ordinarily work into the bearing.

The tough backing under the hard surface will act to prevent spalling of the surface even under the combination of high mechanical pressures and excessive thermal stresses.

Having thus described my invention, what I claim as new, and desire to protect by Letters Patent is:

1. In an earth boring drill, a supporting shaft, an approximately frusto-conical bushing thereon, enclosing the end of said shaft, said bushing being of tough metal, a thin coating of stellite covering the outer surface of said bushing, and a member of hard steel construction enclosing said bushing and rotatable thereon.

2. In an earth boring drill, a supporting shaft, an approximately frusto-conical bushing thereon, enclosing the end of said shaft, said bushing being of tough metal, a thin coating of stellite welded to the entire bearing surface of said bushing, and a member of hard steel construction enclosing said bushing and rotatable thereon.

3. In an earth boring drill, a supporting shaft, an approximately frusto-conical bushing thereon, enclosing the end of said shaft, said bushing being of tough metal, a layer of non-ferrous metal deposited upon the bearing surface of said bushing, and a member enclosing said bushing and rotatable thereon.

In testimony whereof, I hereunto affix my signature, this the 30th day of October, A. D. 1925.

FLOYD L. SCOTT.